United States Patent
Dhaens et al.

(10) Patent No.: US 11,338,637 B2
(45) Date of Patent: May 24, 2022

(54) ELECTRO-MAGNETIC DAMPER WITH AIR SPRING

(71) Applicant: Tenneco Automotive Operating Company Inc., Lake Forest, IL (US)

(72) Inventors: Miguel Dhaens, Lommel (BE); Monzer Al Sakka, Sint-Truiden (BE); Christophe Lauwerys, Heverlee (BE)

(73) Assignee: TENNECO AUTOMOTIVE OPERATING COMPANY INC., Lake Forest, IL (US)

( * ) Notice: Subject to any disclaimer, the term of this patent is extended or adjusted under 35 U.S.C. 154(b) by 512 days.

(21) Appl. No.: 16/258,909

(22) Filed: Jan. 28, 2019

(65) Prior Publication Data

US 2020/0238780 A1 Jul. 30, 2020

(51) Int. Cl.
*B60G 15/14* (2006.01)
*B60G 17/08* (2006.01)
(Continued)

(52) U.S. Cl.
CPC ......... *B60G 15/14* (2013.01); *B60G 17/0155* (2013.01); *B60G 17/0565* (2013.01);
(Continued)

(58) Field of Classification Search
CPC .... B69G 15/14; B69G 17/0155; B69G 17/08; B69G 17/0565; B69G 2500/10;
(Continued)

(56) References Cited

U.S. PATENT DOCUMENTS 4,871,189 A   10/1989  Van Breemen
5,263,558 A * 11/1993  Yamaoka ........... B60G 17/0157
                                                188/267
(Continued)

FOREIGN PATENT DOCUMENTS

CN    103148159 A    6/2013
CN    203756838 U    8/2014
(Continued)

OTHER PUBLICATIONS

Gysen, Bart. L. J. et al, Active Electromagnetic Suspension System for Improved Vehicle Dynamics, published on Mar. 3, 2010, Eindhoven University of Technology, pp. 1-8.
(Continued)

*Primary Examiner* — Xuan Lan Nguyen

(57) ABSTRACT

A damper system for a vehicle is provided that includes a pressurized gas damper, electromagnetic actuator, and pressurized gas spring. The pressurized gas damper includes first and second working chambers that are fluidly connected by a flow control orifice. The electromagnetic actuator includes a stator assembly with a stator cavity and a magnetic rotor that is slidingly received in the stator cavity. The magnetic rotor is fixed to a damper tube that houses the second working chamber. The stator cavity and an end of the damper tube cooperate to define the first working chamber. The pressurized gas spring includes a bellows chamber that extends annularly about the damper tube. The damper tube includes an opening between the second working chamber and the bellows chamber.

20 Claims, 5 Drawing Sheets

(51) Int. Cl.
| | |
|---|---|
| *B60G 17/015* | (2006.01) |
| *B60G 17/056* | (2006.01) |
| *F16F 15/03* | (2006.01) |
| *F16F 15/027* | (2006.01) |
| *F16F 9/32* | (2006.01) |
| *F16F 9/512* | (2006.01) |

(52) U.S. Cl.
CPC ............ *B60G 17/08* (2013.01); *F16F 9/3292* (2013.01); *F16F 9/5126* (2013.01); *F16F 15/027* (2013.01); *F16F 15/03* (2013.01); *B60G 2202/42* (2013.01); *B60G 2500/10* (2013.01); *B60G 2600/24* (2013.01); *B60G 2600/26* (2013.01); *F16F 2222/06* (2013.01); *F16F 2224/041* (2013.01); *F16F 2224/043* (2013.01); *F16F 2228/06* (2013.01); *F16F 2228/066* (2013.01)

(58) Field of Classification Search
CPC ............ B69G 2600/24; B69G 2600/26; B69G 2202/42; F16F 6/00
See application file for complete search history.

(56) References Cited

U.S. PATENT DOCUMENTS

| | | | |
|---|---|---|---|
| 5,293,969 A | 3/1994 | Yamaoka et al. | |
| 5,467,971 A | 11/1995 | Hurtubise et al. | |
| 6,402,128 B1 * | 6/2002 | Trowbridge | B60G 11/28 267/64.11 |
| 6,952,060 B2 | 10/2005 | Goldner et al. | |
| 7,497,423 B2 * | 3/2009 | Myers | B60G 11/28 267/64.21 |
| 7,956,797 B2 | 6/2011 | Talty et al. | |
| 7,997,395 B2 | 8/2011 | Ohkita et al. | |
| 8,253,281 B2 | 8/2012 | Namuduri et al. | |
| 2008/0290624 A1 | 11/2008 | Yamanaka et al. | |
| 2011/0049774 A1 | 3/2011 | Naber | |
| 2017/0074341 A1 | 3/2017 | Leidich et al. | |
| 2017/0219045 A1 | 8/2017 | Glanzner | |

FOREIGN PATENT DOCUMENTS

| | | |
|---|---|---|
| CN | 106224425 A | 12/2016 |
| CN | 106763395 A | 5/2017 |
| CN | 206723336 U | 12/2017 |
| CN | 108105313 A | 6/2018 |
| DE | 10203802 A1 | 10/2002 |
| EP | 1726087 B1 | 2/2011 |
| JP | H0544757 A | 2/1993 |
| JP | H10292847 A | 11/1998 |
| JP | 2002257189 A | 9/2002 |
| JP | 2002257189 A | 9/2002 |
| JP | 2003287082 A | 10/2003 |
| JP | 3629137 B2 | 3/2005 |
| JP | 2009179319 A | 8/2009 |
| WO | WO-2017147038 A1 | 8/2017 |

OTHER PUBLICATIONS

Chen, Long et al., Energy Conservation Analysis and Control of Hybrid Active Semiactive Suspension with Three Regulating Damping Levels, published in 2016, Hindawi Publishing Corporation, China, pp. 1-15.

Gysen, B.L.J., Generalized Harmonic Modeling Technique for 2D Electromagnetic Problems: Applied to the Design of a Direct-Drive Active Suspension System, published on Jan. 1, 2011, pp. 1-272, Eindhoven: Technische Universiteit Eindhoven DOI, The Netherlands.

Ebrahimi, Babak, Development of Hybrid Electromagnetic Dampers for Vehicle Suspension Systems, published in 2009, pp. 1-192, Ontario, Canada.

Ebrahimi, Babak et al., Design of a Hybrid Electromagnetic/Hydraulic Damper for Automotive Suspension Systems, published in 2009, pp. 1-5, Ontario, Canada.

Willems, Marco, Chances and Concepts for Recuperating Damper Systems, published in 2012, pp. 1-20, 21st Aachen Colloquium Automobile and Engine Technology 2012, Ingolstadt, Germany.

Asadi, Ehsan et al., Analysis, Prototyping and Experimental Characterization of an Adaptive Hybrid-Electromagnetic Damper for Automotive Suspension Systems, published in 2016, pp. 1-12.

Ogawa, Keisuke, Hitachi Exhibits Electromagnetic Suspension System, Nikkei Business Publications, Japan, published on Oct. 30, 2006, pp. 1-2.

Ribeiro, Roberto et al., Hybrid Variable Damping Control: Design, Simulation, and Optimization, published online May 20, 2014, Springer-Verlag Berlin, Germany, pp. 1-10.

Heissing, B., Ersoy, M., Fahrwerkhandbuch Grundlagen, Fahrdynamik, Komponenten, Systeme, Mechatronik, Perspektive, Vieweg, 2011.

Schafer, E., Modular-hierarchische modellbasierte Entwicklung und Optimierung einer Regelung für ein aktives Federungssystem, Dissertation Universitat Paderborn, 2009.

Daimler AG, Chassis technology: From independent wheel to active suspension (from 1930), Jan. 2014.

International Search Report and Written Opinion regarding International Application No. PCT/US2020/015191 dated May 22, 2020.

* cited by examiner

ELECTRO-MAGNETIC DAMPER WITH AIR SPRING

FIELD

The present disclosure relates to automotive shock absorbers/dampers. More particularly, the present disclosure relates to active shock absorbers/dampers that use an electro-magnetic actuator to provide a different magnitude of damping based on a frequency as well as a velocity of an input to the shock absorber/damper.

BACKGROUND

The statements in this section merely provide background information related to the present disclosure and may not constitute prior art.

Shock absorbers are typically used in conjunction with automotive suspension systems or other suspension systems to absorb unwanted vibrations that occur during movement of the suspension system. In order to absorb these unwanted vibrations, automotive shock absorbers are generally connected between the sprung (body) and the unsprung (suspension/drivetrain) masses of the vehicle.

Typical passive shock absorbers provide the same magnitude of damping force regardless of the frequency of the input. For a given input velocity, the damping force generated by a conventional passive shock absorber remains the same regardless of the frequency of the input. Typically, the primary ride frequency of a passenger vehicle is in the range of 1 to 2 Hertz. When a vehicle goes over a road surface with a lower frequency input, a higher amount of damping is preferred to manage the road inputs. During handling events (where directional stability is critical), a higher amount of damping is also preferred. For example, the vehicle may be subjected to body roll during handling events. The frequency of body roll in a typical passenger vehicle commonly ranges from 2 to 4 Hertz depending on the roll-stiffness and the height of the center of gravity of the vehicle. When the damper system experiences larger excitation forces, higher damping forces are required. When conventional passive shock absorbers are used, the higher damping forces result in more harshness and a decrease in ride quality.

Active shock absorbers change the damping of the shock absorber in real-time to address different vehicle suspension inputs. There are many types of active shock absorbers. One type of active shock absorber utilizes an electro-magnetic actuator that applies a magnetic force to a piston rod of the shock absorber independent of the damping forces generated by the compression and rebound valving. Such electro-magnetic actuators typically comprise a combination of permanent magnets and a plurality of coils that are co-axially arranged with one another. The permanent magnets may be mounted to the outer tube of the shock absorber and the plurality of coils may be coupled to the piston rod or vice versa. When electricity is supplied to the plurality of coils, the plurality of coils create an electro-magnetic field that interacts with the magnetic field of the permanent magnets and applies a magnetic force to the piston rod. The magnetic force effectively increases or decreases the damping force of the shock absorber, either firming up or softening the suspension.

Unlike passive shock absorbers, electro-magnetic shock absorbers can generate damping forces independently of the velocity of the piston rod inputs. As a result, large excitation forces do not require more hydraulic damping from the shock absorber and therefore do not introduce increased harshness. This is a major advantage of electro-magnetic shock absorbers because it resolves the trade-off in hydraulic damper systems between primary body control (which requires large damping forces) and secondary comfort (which requires low damping forces). Although active shock absorbers can provide ride and handling improvements, they are considerably more expensive than traditional passive shock absorbers due to the high cost of the electro-magnetic materials used in the electro-magnetic actuator. Electro-magnetic shock absorbers also tend to be heavy and bulky because they typically require a shock absorber to be re-designed to accommodate the space required for the permanent magnets and plurality of coils of the electro-magnetic actuator.

SUMMARY

This section provides a general summary of the disclosure, and is not a comprehensive disclosure of its full scope or all of its features.

In accordance with an aspect of the subject disclosure, a damper system for a vehicle is provided. The damper system comprises a pressurized gas damper, an electromagnetic actuator, and a pressurized gas spring. The pressurized gas damper includes a first working chamber and a second working chamber. The first and second working chambers are each filed with a pressurized gas and are fluidly connected by a flow control orifice. The pressurized gas damper has a damper tube that houses the second working chamber. The damper tube extends between first and second damper tube ends.

The electromagnetic actuator of the damper system includes a magnetic rotor and a stator assembly. The magnetic rotor is fixed to and extends annularly about the damper tube. The stator assembly extends annularly about a stator cavity. The stator cavity slidingly receives at least a portion of the magnetic rotor and the first damper tube end. As a result, the stator assembly is translatable relative to the damper tube and the magnetic rotor in a compression direction and an extension direction. As a result of this arrangement, the first working chamber of the pressurized gas damper is positioned within and is defined by the stator cavity and the first damper tube end. The volume of the first working chamber decreases when the stator assembly moves in the compression direction relative to the damper tube and increases when the stator assembly moves in the extension direction relative to the damper tube.

The magnetic rotor includes an array of permanent magnets that have a permanent magnetic field and the stator assembly includes a plurality of coils. An electro-magnetic field is generated in response to the application of an electrical current to the plurality of coils. This electro-magnetic field interacts with the permanent magnetic field of the permanent magnets to apply a magnetic damping force to the damper system that can oppose (i.e., resist) translation of the stator assembly relative to the damper tube in the compression direction and/or the extension direction.

The pressurized gas spring of the damper system includes a bellows element that extends between first and second bellows ends. The first bellows end is sealingly engaged with the stator assembly and the second bellows end is sealingly engaged with the damper tube to define a bellows chamber that extends annularly about at least a portion of the damper tube. The damper tube includes an opening between the second working chamber and the bellows chamber. Therefore, the second working chamber is arranged in fluid communication with both the first working chamber (via the flow control orifice) and the bellows chamber (via the opening in the damper tube). Accordingly, it should be appreciated that the damper system disclosed herein is devoid of a piston and piston rod that are longitudinally translatable relative to the damper tube.

Advantageously, the damper system of the present disclosure provides a shock absorber with active damping and energy harvesting capability at reduced cost, size, complexity, and weight over other active dampers. The presence of a pressurized gas damper in parallel with both an electro-magnetic actuator and a pressurized gas air spring decreases the load requirements of the electro-magnetic actuator and reduces size and therefore the cost of the electro-magnetic actuator. Improvements in ride comfort are achieved over high-frequency motions (e.g., choppiness, shake, filtering) and improved body motion control (e.g., pitch, heave, and roll) is also realized compared to passive shock absorbers. Meanwhile, the pressurized gas damper provides a fail-safe feature should the electro-magnetic actuator malfunction. The pressurized gas spring also provides the ability to provide ride height adjustment and load leveling.

Further areas of applicability and advantages will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
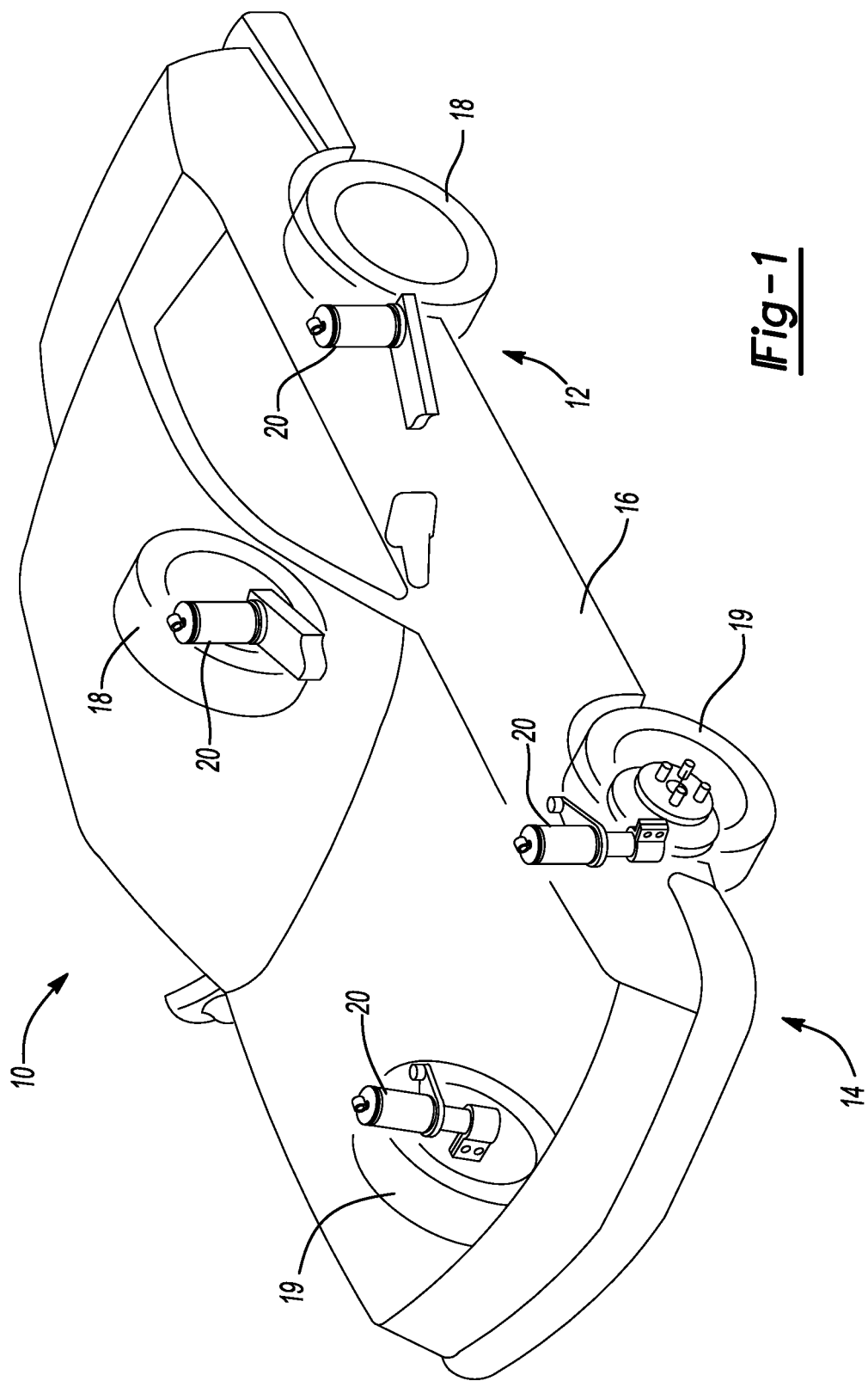
FIG. 1 is an illustration of an exemplary vehicle equipped with a shock absorber in accordance with the teachings of the present disclosure.

The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to FIG. 1, a vehicle 10 including a rear suspension 12, a front suspension 14, and a body 16 is illustrated. Rear suspension 12 has a transversely extending rear axle assembly (not shown) adapted to operatively support the vehicle's rear wheels 18. The rear axle assembly is operatively connected to body 16 by a pair of dampers 20. Similarly, front suspension 14 includes a transversely extending front axle assembly (not shown) to operatively support the vehicle's front wheels 19. The front axle assembly is operatively connected to body 16 by a second pair of dampers 20. The dampers 20 at the four corners of the vehicle 10 dampen the relative motion of the unsprung portion (i.e., front and rear suspensions 14 and 12, respectively) and the sprung portion (i.e., body 16) of vehicle 10 and provide a spring force that pushes the body 16 away from the unsprung portion of the vehicle 10 such that the dampers 20 support the weight of the body 16. While the vehicle 10 has been depicted as a passenger car having front and rear axle assemblies, the dampers 20 may be used with other types of vehicles or machinery, or in other types of applications such as vehicles incorporating independent front and/or independent rear suspension systems. Further, the terms "damper" and "damper system" as used herein are interchangeable and are meant to refer to shock absorbers and shock absorber systems in general that include damper and air spring elements in the same shock absorber unit.

Figure 2:
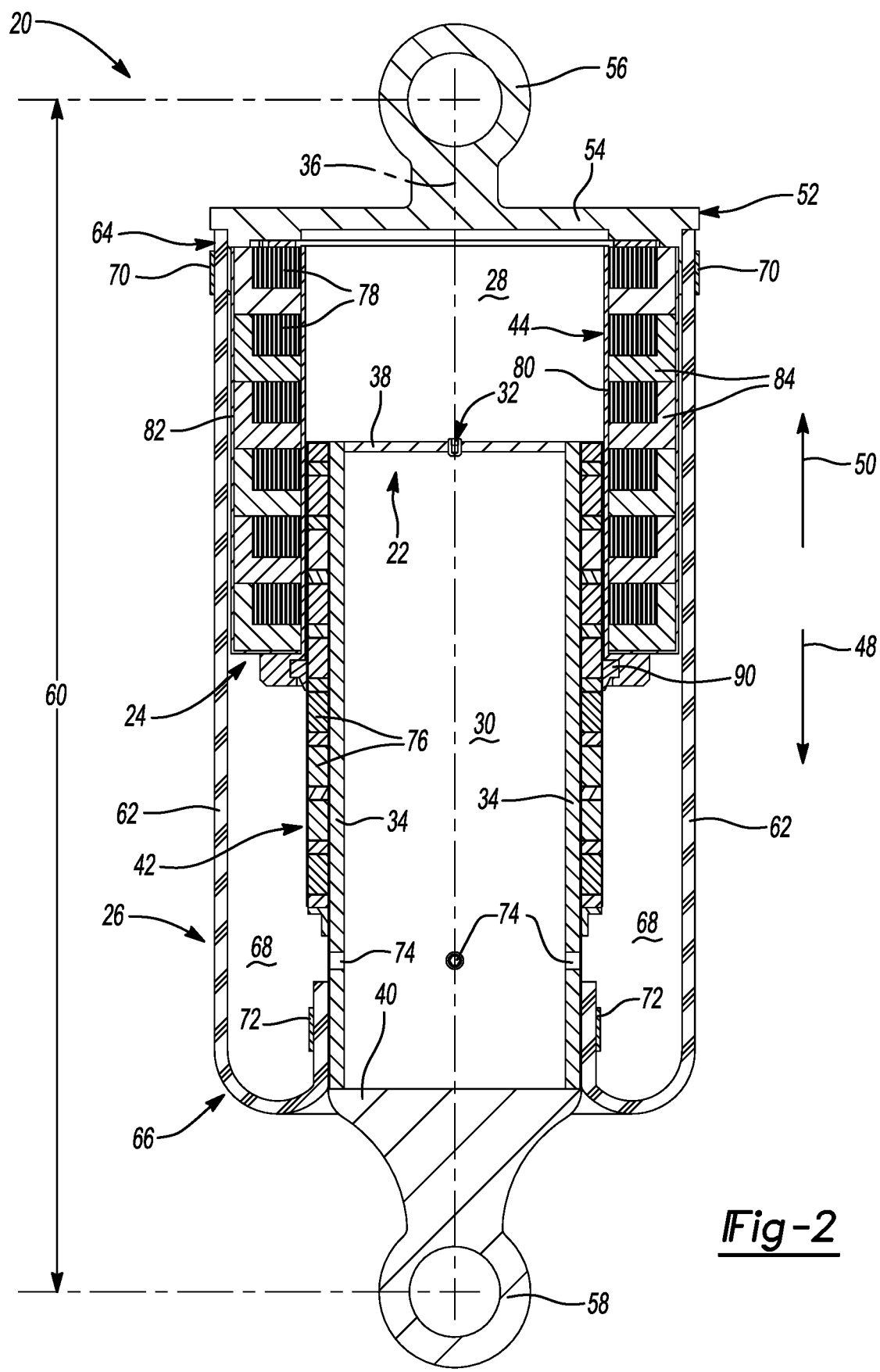
FIG. 2 is a side cross-sectional view of a shock absorber constructed in accordance with the teachings of the present disclosure.

With additional reference to FIG. 2, one of the dampers 20 illustrated in FIG. 1 is shown in greater detail. Each damper 20 comprises a pressurized gas damper 22, an electromagnetic actuator 24, and a pressurized gas spring 26. The pressurized gas damper 22 includes a first working chamber 28 and a second working chamber 30. The first and second working chambers 28, 30 are each filed with a pressurized gas (such as air) and are fluidly connected by a flow control orifice 32. The pressurized gas damper 22 has a damper tube 34 that houses the second working chamber 30. The damper tube 34 is cylindrical in shape, extends annularly about a longitudinal axis 36, and has first and second damper tube ends 38, 40. In the illustrated example, the flow control orifice 32 is an orifice hole that extends through the first damper tube end 38. However, it should be appreciated that the flow control orifice 32 could take the form of multiple orifices that extend through the first damper tube end 38 or could be one or more two-way valves mounted to the first damper tube end 38. In configurations where the flow control orifice 32 is a two-way valve, the break-pressure of the two-way valve can be set at a specified threshold value where no fluid flow is permitted through the flow control orifice 32 until the pressure differential between the first and second working chambers 28, 30 exceeds the break-pressure threshold of the two-way valve. The second damper tube end 40 is closed (i.e., is sealed).

The electromagnetic actuator 24 comprises a combination of a magnetic rotor 42 and a stator assembly 44. The electromagnetic actuator 24 actively controls the longitudinal movement of the stator assembly 44 relative to the damper tube 34 independently of the damping forces generated by the pressurized gas damper 22. In other words, the electromagnetic actuator 24 operates in parallel with the pressurized gas damper 22 to control (i.e., dampen) longitudinal movements of the damper 20.

Figure 3:
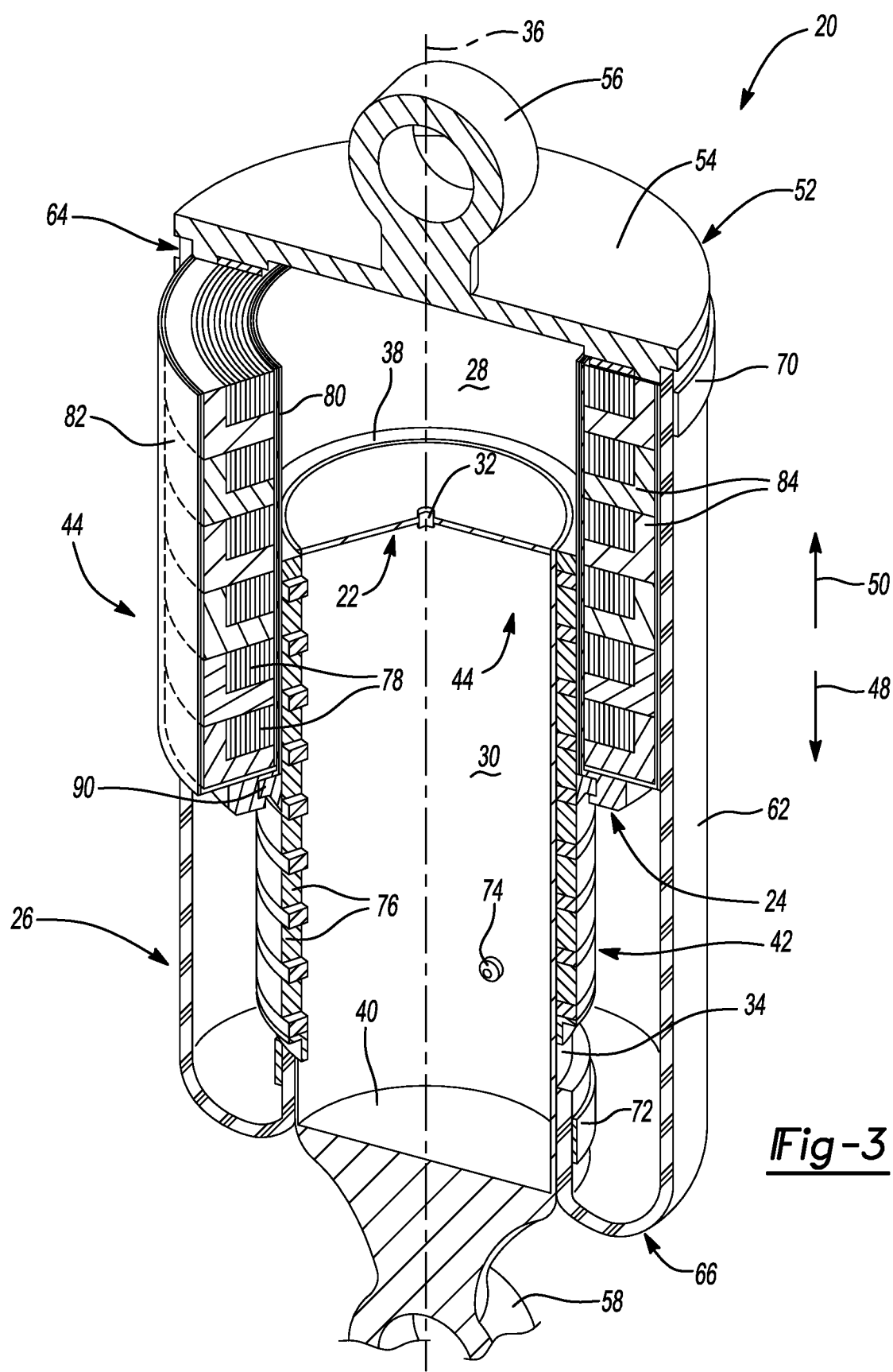
FIG. 3 is a fragmentary perspective view of the shock absorber illustrated in FIG. 2.
Figure 4:
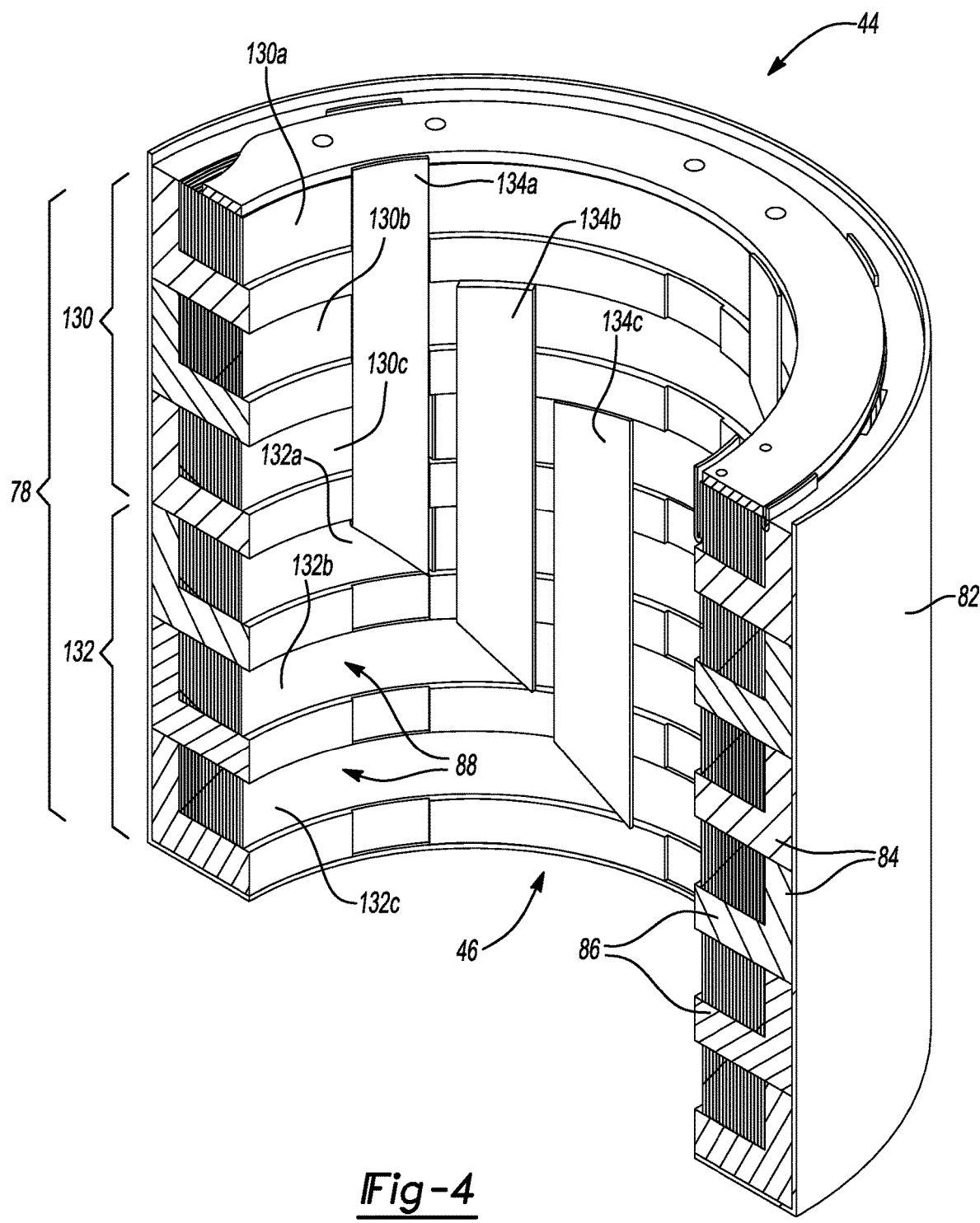
FIG. 4 is a fragmentary perspective view depicting a portion of the stator assembly of the shock absorber illustrated in FIG. 2.
Figure 5:
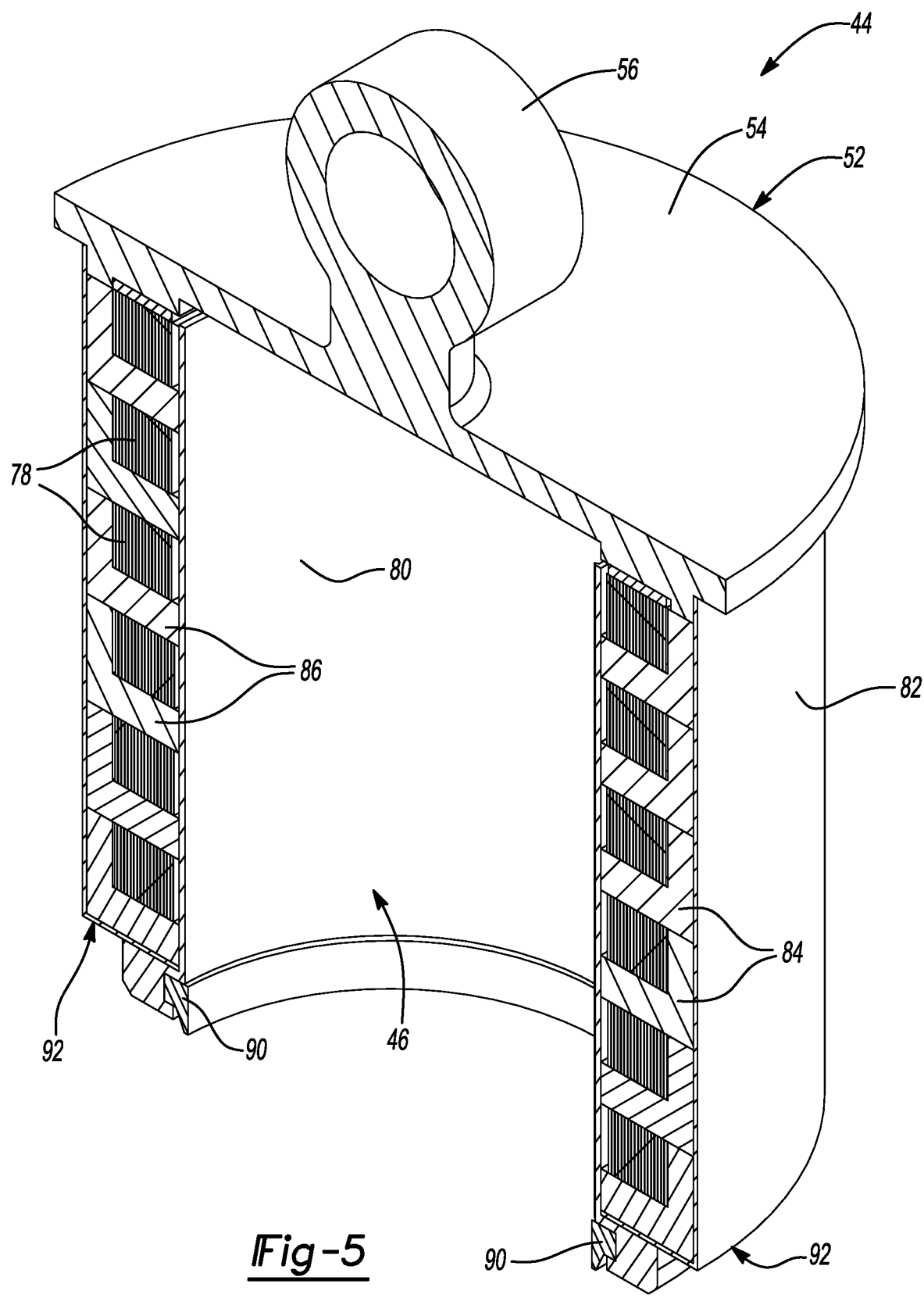
FIG. 5 is a fragmentary perspective view depicting the stator assembly and glide bearings of the shock absorber illustrated in FIG. 2.

With additional reference to FIGS. 3-5, the electromagnetic actuator 24 is located entirely outside the second working chamber 30 in the damper tube 34. The magnetic rotor 42 is fixed to and extends annularly about the damper tube 34. The stator assembly 44 extends annularly about a stator cavity 46. The stator cavity 46 slidingly receives at least a portion of the magnetic rotor 42 and the first damper tube end 38. As a result, the stator assembly 44 is translatable relative to the damper tube 34 and the magnetic rotor 42 in a compression direction 48 and an extension direction 50. The compression and extension directions 48, 50 point in opposite directions 48, 50 and are parallel to the longitudinal axis 36. As a result of this arrangement, the first working chamber 28 of the pressurized gas damper 22 is positioned within and is defined by the stator cavity 46 and the first damper tube end 38. The volume of the first working chamber 28 decreases when the stator assembly 44 moves in the compression direction 48 relative to the damper tube 34 and increases when the stator assembly 44 moves in the extension direction 50 relative to the damper tube 34.

The stator assembly 44 includes a stator body 52 with an end wall 54 having a first attachment fitting 56. The second damper tube end 40 includes a second attachment fitting 58. The first and second attachment fittings 56, 58 are configured to be attached to the unsprung portion (i.e., front and rear suspensions 14 and 12, respectively) and the sprung portion (i.e., body 16) of vehicle 10. In the illustrated example, the first and second attachment fittings 56, 58 are shown in the form of loop structures; however, it should be appreciated that other types of attachment configurations are possible and are considered to be within the scope of the subject disclosure. The first and second attachment fittings 56, 58 are spaced apart by a longitudinal distance 60 that decreases in length when the stator assembly 44 moves in the compression direction 48 relative to the damper tube 34 and that increases in length when the stator assembly 44 moves in the extension direction 50 relative to the damper tube 34.

The pressurized gas spring 26 of the damper 20 system includes a bellows element 62 that extends annularly about portions of the stator assembly 44 and the damper tube 34 and longitudinally between first and second bellows ends 64, 66. The first bellows end 64 is sealingly engaged with the stator assembly 44 and the second bellows end 66 is sealingly engaged with the damper tube 34 to define a bellows chamber 68 that extends annularly about at least a portion of the damper tube 34. Although other configurations are possible, in the illustrated embodiment, the bellows element 62 is made of a resilient material such as rubber (i.e., the bellows element 62 may be provided in the form of a rubber boot) where the first bellows end 64 is attached to the stator assembly 44 with a first circumferentially extending clamp 70 and the second bellows end 66 is attached to the damper tube 34 at a location that is longitudinally between the second damper tube end 40 and the magnetic rotor 42 with a second circumferentially extending clamp 72. As a result, the electromagnetic actuator 24 is positioned inside the bellows element 62 of the pressurized gas spring 26.

The damper tube 34 has openings 74 that extend between the second working chamber 30 and the bellows chamber 68. In the illustrated embodiment, the openings 74 in the damper tube 34 are provided in the form of multiple vent holes that extend through the damper tube 34 at locations positioned longitudinally between the magnetic rotor 42 and the second bellows end 66. Therefore, the second working chamber 30 is arranged in fluid communication with both the first working chamber 28 (via the flow control orifice 32) and the bellows chamber 68 (via the openings 74 in the damper tube 34). It should be appreciated that the openings 74 in the damper tube 34 may alternatively be a single vent hole or one or more two-way valves.

Unlike hydraulic dampers, the damper 20 disclosed herein is devoid of (i.e., lacks) a piston and piston rod that are longitudinally translatable relative to the damper tube 34. The flow control orifice 32 has a first cross-sectional area and the openings 74 in the damper tube 34 have a second cross-sectional area. The first cross-sectional area represents the total cross-sectional area of the flow control orifice 32 and is therefore the sum total of the cross-sectional areas of all of the orifice holes forming the flow control orifice 32 in configurations where multiple orifice holes are used. The second cross-sectional area represents the total cross-sectional area of the openings 74 in the damper tube 34 and is therefore the sum total of the cross-sectional areas of all of the vent holes in configurations where multiple vent holes are used. The second cross-sectional area of the openings 74 in the damper tube 34 is larger than the first cross-sectional area of the flow control orifice 32. As a result, the gas pressure in the first working chamber 28 will exceed the gas pressure in the second working chamber 30 when the stator assembly 44 moves in the compression direction 48 relative to the damper tube 34 and the gas pressure in the second working chamber 30 will exceed the gas pressure in the first working chamber 28 when the stator assembly 44 moves in the extension direction 50 relative to the damper tube 34. The flow control orifice 32 can be tuned such that the pressurized gas damper 22 helps dampen vibrations occurring in wheel hop frequencies such as vibrations in the range of 6 to 8 Hertz or 10 to 12 Hertz.

The magnetic rotor 42 includes an array of permanent magnets 76 that have a permanent magnetic field and the stator assembly 44 includes a plurality of coils 78. An electro-magnetic field is generated in response to the application of an electrical current to the plurality of coils 78. This electro-magnetic field interacts with the permanent magnetic field of the permanent magnets 76 to apply a magnetic damping force to the damper 20 that can oppose (i.e., resist) translation of the stator assembly 44 relative to the damper tube 34 in the compression direction 48 and/or the extension direction 50.

The damper 20 also includes a position sensor (not shown) that is arranged to measure the longitudinal position of the stator assembly 44 relative to the damper tube 34. Although other arrangements are possible, the position sensor may be an optical sensor that is mounted to the stator assembly 44 and configured/placed to read encoded stripes engraved on or otherwise applied to the damper tube 34. The position sensor is electrically connected to a controller (not shown) through a communication network (not shown), such as a CAN bus. Various types of position sensors may be used. By way of non-limiting example, the position sensor may be a linear potentiometer, a Hall Effect sensor, or an optical encoder. While various types of position sensors may be used, preferably, the position sensor has a resolution of 0.1 millimeters (mm) or smaller to ensure an acceptable level of accuracy. The controller is electrically connected to a power source (not shown), which in turn is electrically connected to the coils 78 of the stator assembly 44. The controller controls the power source to selectively supply electric current to the coils 78. As such, the controller is operable to control the amount of force the electromagnetic actuator 24 applies to the stator assembly 44 based at least in part on position (i.e., height) measurements provided by the position sensor. A battery (not shown) may also be electrically connected to the coils 78 of the stator assembly 44. As will be explained in greater detail below, the stator assembly 44 may optionally be used to convert longitudinal movements of the stator assembly 44 relative to the damper tube 34 into electric current. The electric current generated by the coils 78 of the stator assembly 44 may be used to charge the battery or run other electric components of the vehicle. Thus, the controller may be programmed to provide multiple operating modes including an active damping mode of operation and an energy harvesting mode of operation.

The permanent magnets 76 in the magnetic rotor 42 of the electromagnetic actuator 24 are fixed to and extend annularly about the damper tube 34. The permanent magnets 76 have a ring-like shape and are arranged on the damper tube 34 in a longitudinally stacked arrangement (i.e., the permanent magnets 76 are stacked on top of one another on the damper tube 34). The permanent magnets 76 are made from a material that is magnetized. By way of example and without limitation, the permanent magnets 76 may exhibit a Halbach, quasi-Halbach, or slotted pattern of magnetization. Although other arrangements are possible, the damper tube 34 may be made of a ferromagnetic material. By way of example and without limitation, the damper tube 34 cab be made of iron or terrific stainless steel. As a result of the ferromagnetic material of the damper tube 34 and the magnetization pattern of the array of permanent magnets 76, the magnetic field produced by the array of permanent magnets 76 is concentrated on the side of the magnet rotor that faces the stator assembly 44.

Optionally, a coating or thin, non-magnetic sleeve (not shown) may be applied to the side of the magnetic rotor 42 that faces the stator assembly 44 (i.e., the outside surface of the magnetic rotor 42) to protect the array of permanent magnets 76 from corrosion and wear and to provide a smooth, straight contact surface for glide bearing 80. By way of non-limiting example, the coating or thin, non-magnetic sleeve may be made of phenolic resin.

The stator body 52 of stator assembly 44 includes a stator carrier 82 having a tubular shape. The stator carrier 82 extends longitudinally from the end wall 54 and annually about the plurality of coils 78. Each coil 78 in the plurality of coils 78 is supported on a modular ring 84 that has an L-shaped cross-section and each modular ring 84 is received in and is supported by the stator carrier 82. The stator carrier 82 is fixed to and therefore moves with the end wall 54 of the stator assembly 44. Although other materials can be used, the stator carrier 82 can be made of a ferromagnetic material such as ferritic stainless steel. When the first damper tube end 38 is received in the stator cavity 46, the plurality of coils 78 extend annularly about the magnetic rotor 42 and are positioned radially inward of the stator carrier 82. The plurality of coils 78 are spaced radially outwardly from the array of permanent magnets 76 such that the stator assembly 44 is free to slide longitudinally relative magnetic rotor 42.

The array of permanent magnets 76 have a permanent magnetic field that generates an electric current in the plurality of coils 78 when the stator assembly 44 moves longitudinally along the longitudinal axis 36 relative to the damper tube 34 and therefore the magnetic rotor 42. This electric current can be used to charge the battery or power other electric components of the vehicle 10 when the damper 20 is operating in the energy harvesting mode of operation.

In the active damping mode of operation, the power supply sends electric current to the plurality of coils 78. When this occurs, the plurality of coils 78 generate an electro-magnetic field that interacts with the permanent magnetic field of the permanent magnets 76 to apply a magnetic damping force to the stator assembly 44. The interaction between the electro-magnetic field and the permanent magnetic field causes the end wall 54 of the stator assembly 44 to be pushed towards or away from the first damper tube end 38 depending on the direction of the polarity of the electro-magnetic field and the permanent magnetic field. In the active damping mode of operation, the electromagnetic actuator 24 provides control over primary vehicle body movements in the frequency range of 0 to 1.5 Hertz and damping for higher frequency vibrations (vibrations above 20 Hertz).

The plurality of coils 78 may be constructed in various ways. In the illustrated embodiment shown in FIG. 4, the plurality of coils 78 include two sets of three phase windings 130, 132 that are electrically connected in parallel with one another. Each set of three phase windings 130, 132 includes a first current phase winding 130a, 132a, a second current phase winding 130b, 132b, and a third current phase winding 130c, 132c. The first current phase windings 130a, 132a are electrically connected by a first bridge 134a, the second current phase windings 130b, 132b are electrically connected by a second bridge 134b, and the third current phase windings 130c, 132c are electrically connected by a third bridge 134c. The phase of the electric current the power supply sends to the first current phase windings 130a, 132a is different from the phase of the electric current the power supply sends to the second current phase windings 130b, 132b and the third current phase windings 130c, 132c and vice versa. By way of example and without limitation, each phase of electric current may be delayed by 120 degrees. This provides greater power density and better efficiency such that smaller, lighter windings 130, 132 can be used to produce the same amount of electro-magnetic force as larger, single-phase windings.

Each of the first current phase windings 130a, 132a, the second current phase windings 130b, 132b, and the third current phase windings 130c, 132c are formed of loops of copper wire and are longitudinally spaced by base portions 86 of the modular rings 84, which are arranged in between each of the plurality of coils 78. The stacked arrangement of the modular rings 84 creates a plurality of annular slots 88 in the stator assembly 44 that house the plurality of coils 78. The plurality of annular slots 88 have a U-shaped cross-section that is open along the stator cavity 46 and closed on the other three-sides to concentrate/direct the electro-magnetic field generated by the plurality of coils 78 towards the magnetic rotor 42.

In accordance with one embodiment, the plurality of coils 78 and the modular rings 84 are embedded in a resin that holds the plurality of coils 78 and the modular rings 84 together as a single unit. Optionally, one or more temperature sensors (not shown) may be embedded in the resin adjacent to the modular rings 84 to monitor operating temperatures within the stator assembly 44. The temperature sensors can be electrically connected to the controller, which can change or discontinue a mode of operation and/or activate a cooling system (not shown) based upon the temperature readings of the temperature sensors to prevent the stator assembly 44 from overheating.

The glide bearing 80 of the stator assembly 44 is disposed radially between the plurality of coils 78 and the permanent magnets 76 of the magnetic rotor 42. The glide bearing 80 moves longitudinally with the stator assembly 44 and is arranged in a sliding fit with the magnetic rotor 42 such that the magnetic rotor 42 and the stator assembly 44 can slide longitudinally relative to one another. The glide bearing 80 reduces friction and guides translation of the magnetic rotor 42 and the stator assembly 44 in a direction that is parallel to the longitudinal axis 36. Due to manufacturing tolerances, there is typically one side of the stator cavity 46 where the magnetic flux is slightly higher. As a result, the stator assembly 44 tends to hug one side of the magnetic rotor 42, which accelerates wear. The glide bearing 80 helps keep the stator assembly 44 centered over the magnetic rotor 42 and prevents the stator assembly 44 from tilting or gimbaling relative to the damper tube 34 for improved service life and decreased wear. The material of the glide bearing 80 may have a coefficient of friction of less than 0.25 when brought into contact with the magnetic rotor 42. The material of the glide bearing 80 may also be a non-magnetic material with a magnetic permeability of less than 0.000005 henries per meter (H/m) to avoid deformation of the magnetic flux lines of the permanent magnetic field and the electro-magnetic field. By way of non-limiting example, the glide bearing 80 may be made of a material such as phenolic resin, glass-reinforced polyamide, or polytetrafluoroethylene (PTFE).

The stator assembly 44 may also include a wiper ring 90 that contacts the magnetic rotor 42 in a sliding fit to prevent contaminants from entering the stator cavity 46. Although several configurations are possible, in the illustrated embodiment, the wiper ring 90 is attached to the stator body 52 at a distal end 92 of the stator carrier 82 opposite the end wall 54 of the stator body 52.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the subject disclosure, and all such modifications are intended to be included within the scope of the subject disclosure.

What is claimed is:

1. A damper system for a vehicle, comprising:
a pressurized gas damper including a first working chamber and a second working chamber, each filed with a pressurized gas, that are fluidly connected by a flow control orifice, the pressurized gas damper including a damper tube that houses the second working chamber and extends between first and second damper tube ends;
an electromagnetic actuator including a magnetic rotor fixed to and extending annularly about the damper tube and a stator assembly extending annularly about a stator cavity that slidingly receives at least a portion of the magnetic rotor and the first damper tube end such that the stator assembly is translatable relative to the damper tube and the magnetic rotor in a compression direction and an extension direction, the first working chamber positioned within the stator cavity; and
a pressurized gas spring including a bellows element that defines a bellows chamber extending annularly about at least a portion of the damper tube, the damper tube including an opening between the second working chamber and the bellows chamber such that the second working chamber inside the damper tube is arranged in fluid communication with the first working chamber via the flow control orifice and is arranged in fluid communication with the bellows chamber via the opening in the damper tube, wherein the flow control orifice generates a pressure differential between the first working chamber and the second working chamber when the stator assembly moves relative to the damper tube.

2. The damper system of claim 1, wherein the stator assembly includes a stator body and a plurality of coils that extend annularly about the stator cavity.

3. The damper system of claim 2, wherein the stator body includes a stator carrier having a tubular shape that extends annularly about the plurality of coils.

4. The damper system of claim 3, wherein each coil in the plurality of coils is supported on a modular ring that has an L-shaped cross-section, each modular ring being received in and supported by the stator carrier.

5. The damper system of claim 2, further comprising:
at least one glide bearing that is disposed radially between the plurality of coils and the magnetic rotor, wherein the at least one glide bearing moves longitudinally with the stator assembly, is arranged in a sliding fit with the magnetic rotor, and cooperates with the stator body to define the first working chamber.

6. The damper system of claim 1, wherein the magnetic rotor includes an array of permanent magnets that are fixed to the damper tube.

7. The damper system of claim 6, wherein the damper tube is made of a ferromagnetic material and the array of permanent magnets are arranged on the damper tube in a longitudinally stacked arrangement.

8. The damper system of claim 1, wherein the magnetic rotor includes an array of permanent magnets that have a permanent magnetic field that generates an electrical current in the plurality of coils when the stator assembly moves longitudinally relative to the damper tube in an energy harvesting mode of operation and the plurality of coils generate an electro-magnetic field in response to the application of an electrical current to the plurality of coils that interacts with the permanent magnetic field of the permanent magnets to apply a magnetic damping force to the damper system in an active damping mode of operation.

9. The damper system of claim 1, wherein the plurality of coils include at least one set of three phase windings.

10. The damper system of claim 1, wherein the stator assembly includes a wiper ring that extends annularly about and contacts the magnetic rotor in a sliding fit to create a seal between the stator assembly and the magnetic rotor.

11. The damper system of claim 1, wherein the flow control orifice has a first cross-sectional area and the opening in the damper tube has a second cross-sectional area that is larger than the first cross-sectional area of the flow control orifice such that gas pressure in the first working chamber exceeds gas pressure in the second working chamber when the stator assembly moves in the compression direction relative to the damper tube and the gas pressure in the second working chamber exceeds the gas pressure in the first working chamber when the stator assembly moves in the extension direction relative to the damper tube.

12. The damper system of claim 1, wherein the stator body includes an end wall having a first attachment fitting, the second damper tube end includes a second attachment fitting, and the first and second attachment fittings are spaced apart by a longitudinal distance that decreases in length when the stator assembly moves in the compression direction relative to the damper tube and that increases in length when the stator assembly moves in the extension direction relative to the damper tube.

13. The damper system of claim 1, wherein the flow control orifice is one or more orifice holes extending through the first damper tube end.

14. The damper system of claim 1, wherein the flow control orifice is a two-way valve mounted to the first damper tube end.

15. The damper system of claim 1, wherein the opening in the damper tube is one or more vent holes extending through the damper tube between the magnetic rotor and the second damper tube end.

16. A damper system for a vehicle, comprising:
a pressurized gas damper including a first working chamber and a second working chamber, each filed with a pressurized gas, that are fluidly connected by a flow control orifice, the pressurized gas damper including a damper tube that houses the second working chamber and extends between first and second damper tube ends;
an electromagnetic actuator including a magnetic rotor fixed to and extending annularly about the damper tube and a stator assembly extending annularly about a stator cavity that slidingly receives at least a portion of the magnetic rotor and the first damper tube end such that the stator assembly is translatable relative to the damper tube and the magnetic rotor in a compression direction and an extension direction, the first working chamber positioned within the stator cavity; and
a pressurized gas spring including a bellows element extending between a first bellows end that is sealingly engaged with the stator assembly and a second bellows end that is sealingly engaged with the damper tube to define a bellows chamber that extends annularly about at least a portion of the damper tube,
wherein the damper system is devoid of a piston and piston rod that is longitudinally translatable relative to the damper tube, where the flow control orifice generates a pressure differential between the first working chamber and the second working chamber when the stator assembly moves relative to the damper tube.

17. The damper system of claim 16, wherein the damper tube includes an opening between the second working chamber and the bellows chamber such that the second working chamber inside the damper tube is arranged in fluid communication with the first working chamber via the flow control orifice and is arranged in fluid communication with the bellows chamber via the opening in the damper tube.

18. The damper system of claim 17, wherein the flow control orifice has a first cross-sectional area and the opening in the damper tube has a second cross-sectional area that is larger than the first cross-sectional area of the flow control orifice such that gas pressure in the first working chamber exceeds gas pressure in the second working chamber when the stator assembly moves in the compression direction relative to the damper tube and the gas pressure in the second working chamber exceeds the gas pressure in the first working chamber when the stator assembly moves in the extension direction relative to the damper tube.

19. A damper system for a vehicle, comprising:
a pressurized gas damper including a first working chamber and a second working chamber, each filed with a pressurized gas, that are fluidly connected by a flow control orifice, the pressurized gas damper including a damper tube that houses the second working chamber and extends between first and second damper tube ends;
an electromagnetic actuator including a magnetic rotor fixed to and extending annularly about the damper tube and a stator assembly extending annularly about a stator cavity that slidingly receives at least a portion of the magnetic rotor and the first damper tube end such that the stator assembly is translatable relative to the damper tube and the magnetic rotor in a compression direction and an extension direction, the first working chamber positioned within the stator cavity; and
a pressurized gas spring including a bellows element extending between a first bellows end that is sealingly engaged with the stator assembly and a second bellows end that is sealingly engaged with the damper tube to define a bellows chamber that extends annularly about at least a portion of the damper tube, the damper tube including an opening between the second working chamber and the bellows chamber such that the second working chamber inside the damper tube is arranged in fluid communication with the bellows chamber, wherein the magnetic rotor includes an array of permanent magnets that have a permanent magnetic field and the stator assembly includes a plurality of coils that generate an electro-magnetic field in response to the application of an electrical current to the plurality of coils that interacts with the permanent magnetic field of the permanent magnets to apply a magnetic damping force to the damper system, wherein the flow control orifice generates a pressure differential between the first working chamber and the second working chamber when the stator assembly moves relative to the damper tube.

20. The damper system of claim 19, wherein each coil in the plurality of coils is supported on a modular ring that has an L-shaped cross-section that is open to the stator cavity to concentrate an electro-magnetic field generated by the plurality of coils towards the magnetic rotor.

* * * * *